(12) United States Patent
Jiang et al.

(10) Patent No.: US 8,590,972 B2
(45) Date of Patent: Nov. 26, 2013

(54) SEAT RECLINER AND SEAT HAVING THE SAME

(75) Inventors: Chong Jiang, Hubei (CN); Xing Huang, Hubei (CN); Zhengkun Huang, Hubei (CN); Jian Du, Hubei (CN)

(73) Assignee: Hubei Aviation Precision Machinery Technology Co., Ltd., Hubei (CN)

( * ) Notice: Subject to any disclaimer, the term of this patent is extended or adjusted under 35 U.S.C. 154(b) by 138 days.

(21) Appl. No.: 13/141,889

(22) PCT Filed: Jan. 11, 2010

(86) PCT No.: PCT/CN2010/070110
§ 371 (c)(1),
(2), (4) Date: Jun. 23, 2011

(87) PCT Pub. No.: WO2011/003288
PCT Pub. Date: Jan. 13, 2011

(65) Prior Publication Data
US 2011/0254337 A1    Oct. 20, 2011

(30) Foreign Application Priority Data
Jul. 4, 2009    (CN) .......................... 2009 1 0158860

(51) Int. Cl.
*B60N 2/02*    (2006.01)
(52) U.S. Cl.
USPC ...................................... 297/362; 297/362.12
(58) Field of Classification Search
USPC .............................. 297/362, 362.11, 362.12
See application file for complete search history.

(56) References Cited

U.S. PATENT DOCUMENTS 6,755,470 B2 *    6/2004  Iwata et al. .................... 297/362
7,281,765 B2 *   10/2007  Scholz et al. .................. 297/362
(Continued)

FOREIGN PATENT DOCUMENTS

| CN | 2479814 | 3/2002 |
| CN | 1370119 | 9/2002 |
| CN | 1672979 | 9/2005 |
| CN | 1918018 | 2/2007 |
| CN | 2907393 | 6/2007 |

(Continued)

*Primary Examiner* — Sarah B McPartlin
(74) *Attorney, Agent, or Firm* — Workman Nydegger (57) ABSTRACT

A seat recliner comprises an inner toothed plate (2) having an inner ring gear (21), an outer toothed plate (3) having an outer ring gear, an eccentric wheel (4) and a wedge-shaped block (6). A shaft shoulder (22) is provided in the center of the inner toothed plate (2), and an axis central hole (32) is provided in the center of the outer toothed plate (3). The outer ring gear engages with the inner ring gear (21), and a radially eccentric area is formed between the shaft shoulder (22) and the axis central hole (32). The eccentric wheel (4) is disposed in the radially eccentric area, and appears entirely in the shape of an eccentric ring, and a planetary gear transmission mechanism with small difference between the number of teeth is constituted by the eccentric wheel (4), the inner toothed plate (2) and the outer toothed plate (3). The eccentric wheel (4) in the large-diameter segment of the radially eccentric area forms a clearance fit with the shaft shoulder (22) and the axis central hole (32). The wedge-shaped block (6) is disposed in the radially eccentric area, and clearances between the eccentric wheel (4) and the axis central hole (32) of the outer toothed plate (3) and between the engaged teeth are eliminated by the wedge-shaped block (6) and the eccentric wheel (4) under a circumferential force exerted by an elastomer (7). The seat recliner has extremely high and stable strength performance. A seat having the seat recliner is also provided.

16 Claims, 5 Drawing Sheets

(56) References Cited

U.S. PATENT DOCUMENTS

| | | | |
|---|---|---|---|
| 7,497,519 B2 * | 3/2009 | Dill et al. | 297/362 |
| 2006/0290187 A1 * | 12/2006 | Scholz et al. | 297/362 |
| 2008/0272639 A1 * | 11/2008 | Huang et al. | 297/362 |

FOREIGN PATENT DOCUMENTS

| | | |
|---|---|---|
| CN | 101070055 | 11/2007 |
| CN | 101208220 | 6/2008 |

* cited by examiner

Fig. 10 a shaft shoulder is provided at a center of the inner toothed plate. The outer toothed plate is fixedly connected with a seat cushion, and an axis central hole is provided at a center of the outer toothed plate. The outer ring gear is engaged with the inner ring gear, and a radially eccentric region is formed between the shaft shoulder and the axis central hole. The eccentric wheel is disposed in the radially eccentric region. The eccentric wheel, the inner toothed plate and the outer toothed plate form a planetary gear transmission mechanism with small tooth number difference. The wedge-shaped block is disposed in the radially eccentric region; and the eccentric wheel and the wedge-shaped block are configured to eliminate a clearance between the eccentric wheel and the axis central hole of the outer toothed plate as well as a clearance between engaged teeth under a circumferential force exerted by an elastic member. The drive component drives the eccentric wheel or the wedge-shaped block so as to rotate the inner toothed plate by an angle relative to the outer toothed plate. The eccentric wheel is of integral eccentric annular shape and fully occupies a positive eccentric region between the shaft shoulder of the inner toothed plate and the axis central hole of the outer toothed plate; the wedge-shaped block is disposed in a recess of the eccentric wheel.

SEAT RECLINER AND SEAT HAVING THE SAME

The present application claims benefit of the priority to CN application No. 200910158860.7 titled "SEAT RECLINER AND SEAT HAVING THE SAME", filed with the Chinese State Intellectual Property Office on Jul. 4, 2009. The entire disclosure thereof is incorporated herein by reference.

FIELD OF THE INVENTION

The present invention relates to a seat which is adjustable in the angle of the seat back, and specifically to a seat recliner and a seat having the same.

BACKGROUND OF THE INVENTION

The seat recliner is used to connect the seat cushion and the seat back of the seat of vehicle so as to improve the comfort of the seat. A passenger may adjust the angle of the seat back to an optimum position by the seat recliner, so as to obtain a most comfortable and customary seating angle. For a driver, the best visual field may be achieved, and manipulated members such as steering wheel, brake pedal and shift lever are easily manipulated by adjusting the angle of the seat back.

At present, the seat recliner generally includes two types. One type of the seat recliner is a leaf spring type adjusting mechanism on the basis of the principle of the ratchet wheel and pawl mechanism; and the other type of the seat recliner is a gear type adjusting mechanism on the basis of the principle of the planetary gear transmission.

For the gear type recliner on the basis of the principle of the planetary gear transmission, due to the inevitable manufacture error, there is a clearance inside such recliner. In use, this clearance results in a greater swaying of the seat back in forward-backward direction relative to the seat cushion with noise, which in turn affects the comfort of the seat.

In order to eliminate the above-mentioned clearance, the conventional gear type recliner is generally provided with a separate wedge clearance eliminating mechanism, and such mechanism serves as a turning-arm wheel in a planetary gear transmission mechanism with small tooth number difference. However, there are two prominent problems for such structure. One problem is that, since the wedging component is two separate structures and the load is mainly applied on one wedge, the contact portion is substantially deformed due to the concentration of stress, and thus the internal engagement area of gears between movable members and fixed members is decreased, which affects the force state of a single tooth and doesn't fully embody the feature of the high engagement strength of the planetary gear transmission with small tooth number difference. The other problem is that, there is a big space in an eccentric region for such separate wedge clearance eliminating mechanism, thereby causing instable strength and a larger strength fluctuation of the recliner.

SUMMARY OF THE INVENTION

In view of the above disadvantages, the technical problem to be solved by the present invention is to provide a seat recliner which may eliminate the clearance to improve the comfort and security of the seat and ensure that the recliner has a very high, stable strength performance.

The seat recliner according to the present invention includes an inner toothed plate having an inner ring gear, an outer toothed plate having an outer ring gear, an eccentric wheel, a wedge-shaped block and a drive component. The inner toothed plate is fixedly connected with a seat back, and Preferably, the recess for receiving the wedge-shaped block is provided at a position on the eccentric wheel deviating from a positive eccentric direction, and the wedge-shaped block is rotatable in the recess circumferentially.

Preferably, the elastic member is a wedging torsion spring, and has two axial supporting legs which are disposed in the same direction. One axial supporting leg is insertedly installed in the wedge-shaped block, and the other axial supporting leg abuts against a side wall of the recess close to the positive eccentric direction.

Preferably, a depression is provided on the side wall of the recess abutting against the axial supporting leg of the wedging torsion spring, and the depression has a cross section of a semicircle shape or a rectangular shape.

Preferably, the wedging torsion spring and the wedge-shaped block are respectively provided at opposite sides of the eccentric wheel. An arc groove is provided in a bottom wall of the recess of the eccentric wheel. The two axial supporting legs of the wedging torsion spring extend through the arc groove, and then fit with the wedge-shaped block and the eccentric wheel, respectively.

Preferably, a thickness of the wedge-shaped block matches with a depth of the recess of the eccentric wheel.

The seat according to the present invention includes a seat cushion and a seat back which are hinged together, and a seat recliner provided between the seat cushion and the seat back. The seat recliner adopts the above-mentioned recliner.

After the seat recliner according to the present invention is assembled with a seat, the inner toothed plate of the seat recliner is fixedly connected with the seat back, and the outer toothed plate is fixedly connected with the seat cushion (theoretically, the assembling relationship may be adjusted, that is, the inner toothed plate is fixed with the seat cushion, and the outer toothed plate is fixed with the seat back). After the outer ring gear of the outer toothed plate is engaged with the inner ring gear of the inner toothed plate, a radially eccentric region may be formed between the shaft shoulder of the inner toothed plate and the axis central hole of the outer toothed plate. The eccentric wheel and the wedge-shaped block are disposed in the radially eccentric region, and are wedged under the action of the elastic member. When the angle of the seat back of the seat is to be adjusted, a passenger exerts a driving torque to the drive component, which further drives the eccentric wheel or the wedge-shaped block, so as to reliably achieve an stepless adjustment of the angle of the seat back on the basis of the principle of the planetary gear transmission mechanism with small tooth number difference. After the angle is adjusted, the circumferential force of the elastic member is applied on the eccentric wheel and the wedge-shaped block. When the eccentric wheel and the wedge-shaped block abut against the wall of the axis central hole of the outer toothed plate and the shaft shoulder of the inner toothed plate, the clearances may be eliminated, thereby greatly improving the comfort of the seat.

When the recliner is in the wedging state, the radial inner and outer contours of the wedge-shaped block are located outside the radial inner and outer contours at the corresponding portion of the recess of the eccentric wheel. When a larger load is applied on the movable member, i.e., the inner toothed plate, and these contact parts are deformed elastically and plastically to a certain degree, the wedge-shaped block is rotated circumferentially under the action force between the wedge-shaped block and the outer circle of the central boss of the inner toothed plate, the inner circle of the outer toothed plate, and when the rotation direction is the direction in which the elastic force of the elastic member is overcome, the wedge-shaped block will be rotated by a certain angle along the shaft shoulder of the inner toothed plate to a corresponding position where the contours thereof are inside the radial inner and outer contours of the eccentric wheel. The outer side contour of the pressed region of the eccentric wheel contacts with the inner circle of the outer toothed plate, and the inner side contour of the pressed region of the eccentric wheel contacts with the outer circle of the central boss of the inner toothed plate. At this moment, the wedge-shaped block will not rotate any more, and prevents the eccentric distance from being further decreased together with the eccentric wheel, so as to ensure the internal engagement dimension with small tooth number difference, thereby increasing the engagement strength. Since the eccentric wheel fills with the whole positive eccentric region and has a very high strength, when the load applied on the seat back and the inner toothed plate is further increased, the axis central hole of the outer toothed plate, the shaft shoulder of the inner toothed plate and the eccentric wheel are plastically deformed partially. Thus, the force acting on the eccentric wheel is distributed on the whole contour of the eccentric wheel, so as to improve the force state of parts and enhance the compression resistant ability of the eccentric wheel, which greatly increases the overall strength of the adjusting mechanism.

In the preferred embodiments of the present invention, the wedge-shaped block is disposed in the recess of the eccentric wheel, and the axial outer end surfaces of them are approximately flush with each other, so as to reduce the axial dimension of the recliner and increase the applicability.

The seat recliner according to the present invention is suitable to be produced in mass production, and has advantages of a good manufacturing technology and a low manufacture cost. It is applicable for various seats in which it is necessary to adjust the angle of the seat back, especially for the seat of vehicles.

In the drawings:
seat recliner 100, jacket 1, inner toothed plate 2, inner ring gear 21, shaft shoulder 22, center hole 23, outer toothed plate 3, outer ring gear 31, axis central hole 32, central boss 33, eccentric wheel 4, recess 41, convex arc surface 42, boss 43, boss 44, inner side contour 45, outer side contour 46, first receiving region 47, second receiving region 47', top side wall 48, top side wall 48', inner wall 49, semicircle 491, arc groove 410, drive component 5, first drive arm 51', second drive arm 51, rotation shaft 52, groove 53, groove 54, wedge-shaped block 6, large end surface 61, hole 62, convex arc surface 63, small end surface 64, wedging torsion spring 7, axial supporting leg 71, axial supporting leg 71', axial bended section 72, locking sheet 8, arc groove 81, position hole 82, position hole 83, circumferential opening 84, inner hole 85, arc hole 86, arc hole 86', sealing cover 10, center hole 101

DETAILED DESCRIPTION OF THE INVENTION

The embodiments will be described in detail in this specification with reference to drawings below.

Some terms denoting orientation such as inner side and outer side throughout the specification, are defined based on the axis of the seat recliner, that is, the side close to the axis is defined as the inner side, while the side far from the axis is defined as the outer side. It should be noted that, the use of the above orientation terms shouldn't be deemed to limit the scope claimed in the patent application.

In addition, a positive eccentric direction in this specification is referred to the direction along which the radial space size becomes the largest in an eccentric region, and the region in the positive eccentric direction is referred to as a positive eccentric region.

Figure 1:
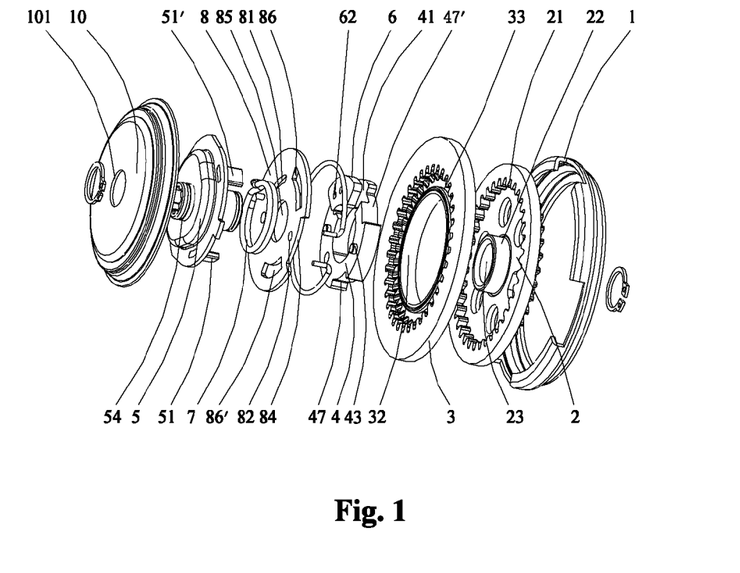
FIGS. 1 and 2 are exploded assembling views of the seat recliner viewed from different directions, respectively.
Figure 2:
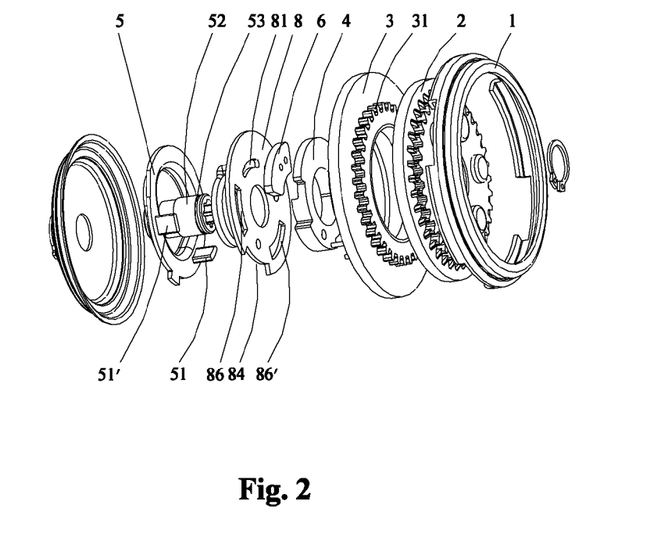

Referring to FIGS. 1 and 2, FIGS. 1 and 2 are exploded assembling views of the seat recliner viewed from different directions, respectively. The seat recliner mainly includes a gear transmission mechanism, a clearance eliminating component and a drive component.

Figure 3:
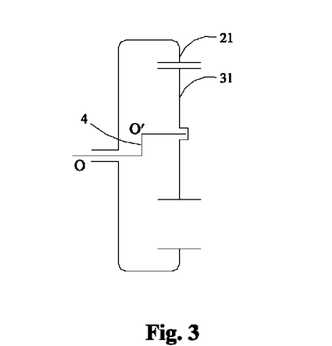
FIG. 3 is a structural schematic view of the gear transmission mechanism in the seat recliner according to the present invention.

The gear transmission mechanism adopts a single stage inner planetary gear transmission with small tooth number difference. An inner toothed plate 2 having an inner ring gear 21 is fixedly connected with a seat back, and an outer toothed plate 3 having an outer ring gear 31 is fixedly connected with a seat cushion. The outer toothed plate 3 and the inner toothed plate are disposed in a jacket 1. The shrinkage opening of the jacket 1 is fixedly coupled with the outer toothed plate 3. After being assembled, the outer ring gear 31 of the outer toothed plate 3 is engaged with the inner ring gear 21 of the inner toothed plate 2. A shaft shoulder 22 at the center of the inner toothed plate 2 is insertedly installed in an axis central hole 32 at the center of the outer toothed plate 3, and the shaft shoulder 22 is eccentrically disposed relative to the axis central hole 32 so as to form a radially eccentric region therebetween. An eccentric wheel 4 is provided in the radially eccentric region, and forms a planetary gear transmission mechanism with small tooth number difference together with the inner ring gear 21 and the outer ring gear 31. The structural schematic view of the transmission mechanism is shown in FIG. 3. When an operation torque is applied to a drive component 5, the drive component 5 drives the inner ring gear 21 to rotate via the eccentric wheel 4 and the outer ring gear 31, so that the outer toothed plate 3 rotates relative to the inner toothed plate 2 to adjust the angle of the seat back. Since there is a certain clearance between the engaged teeth, there may be a corresponding clearance on the seat back, which results in the wobble of the seat back and thus reduces the comfort of the seat. A wedge-shaped block 6 in the embodiment may eliminate the clearance between components under the circumferential force of a wedging torsion spring 7.

Figure 4:
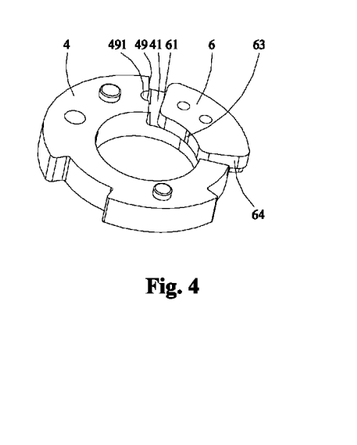
FIG. 4 shows the position relationship between the wedge-shaped block and the eccentric wheel.
Figure 5:
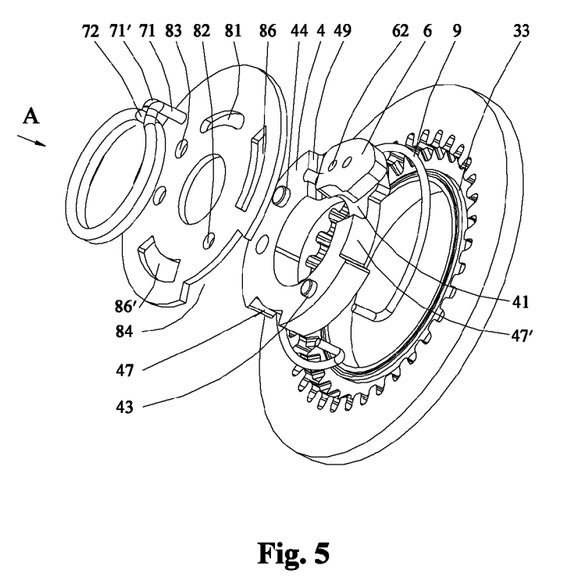
FIG. 5 is an exploded view showing the assembling relationship among the wedge-shaped block, the eccentric wheel, the wedging torsion spring and the inner toothed plate according to the present invention.

Referring to FIGS. 4 and 5, the position relationship between the wedge-shaped block and the eccentric wheel is shown in FIG. 4; and an exploded view showing the assembling relationship among the wedge-shaped block, the eccentric wheel, the wedging torsion spring and the inner toothed plate is shown in FIG. 5.

The wedge-shaped block 6 is disposed within a recess 41 of the eccentric wheel 4, and the axial outer end surfaces of them are approximately flush with each other. The wedge-shaped block 6 is rotatable in the circumferential direction in the eccentric region, i.e., rotates around the shaft shoulder 22 of the inner toothed plate 2. It is appreciated that, the recess 41 in which the wedge-shaped block 6 is placed may reduce the axial size of the recliner. The wedging torsion spring 7 has an axial supporting leg 71 and an axial supporting leg 71' which are disposed in the same direction. When being assembled, the two axial supporting legs of the wedging torsion spring 7 are pre-turned to be deformed, and the axial supporting leg 71 is insertedly installed in a hole 62 of the wedge-shaped block 6 after passing through an arc groove 81 of a locking sheet 8, and the axial supporting leg 71' abuts against an inner wall 49 of the recess 41 opposite to the large end portion of the wedge-shaped block after passing through the arc groove 81 of the locking sheet 8. A semicircle 491 matching with the outer diameter of the axial supporting leg 71' is provided on the inner wall 49, to improve the operation stability of the wedging torsion spring 7.

As shown in FIG. 5, the wedging torsion spring 7 has an axial bended section 72 at the whole turn portion between the two supporting legs 71 and 71'.

Figure 6:
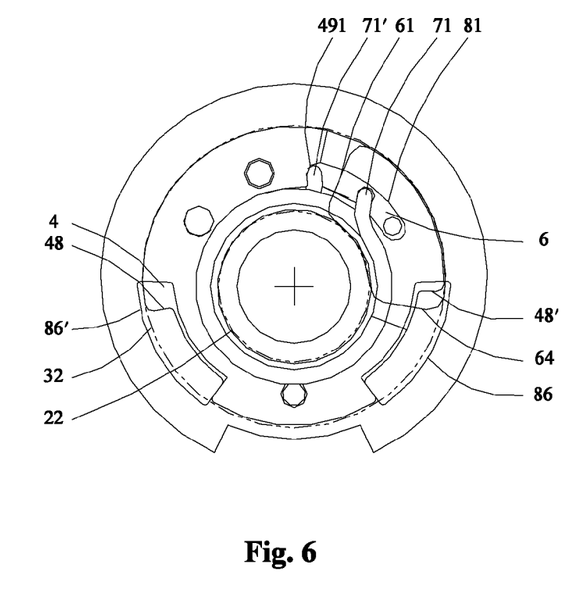
FIG. 6 is a view from direction A after the components shown in FIG. 5 are assembled together.

Referring to FIG. 6, FIG. 6 is a view from direction A after the components shown in FIG. 5 are assembled together.

The wedge-shaped block 6 and the eccentric wheel 4 are circumferentially rotated towards a small diameter section of the eccentric region under the elastic deformation energy of the pre-compressed wedging torsion spring 7 till they are in a wedging state, in which the inner side surfaces and the outer side surfaces of the wedge-shaped block 6 and the eccentric wheel 4 abut against the shaft shoulder 22 and the axis central hole 32, respectively. It is noted that, the wedging torsion spring 7 may be any elastic member of other structural forms, as long as it can provide an elastic force for wedging in the state of non-adjusting, which falls into the protection scope of the application.

Figure 7:
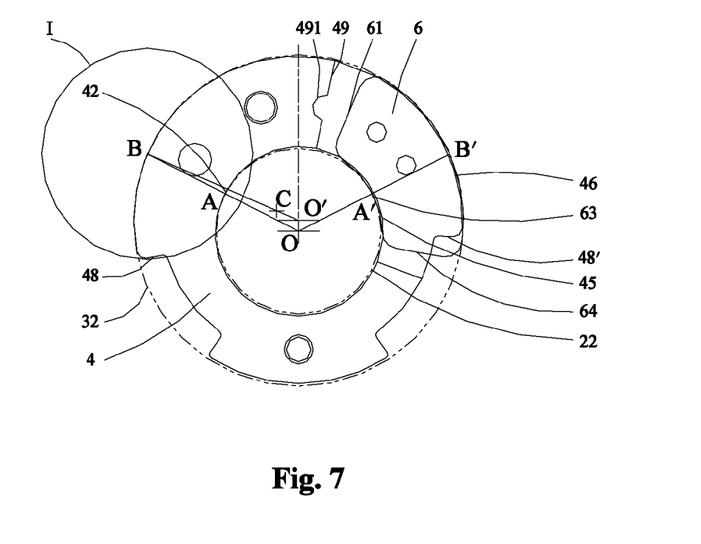
FIG. 7 shows the fitting relationship between the eccentric wheel, the wedge-shaped block and the axis central hole, the shaft shoulder.
Figure 8:
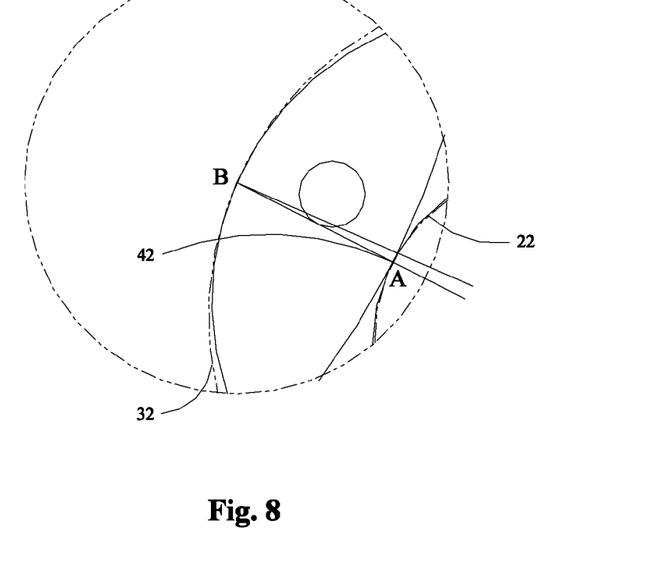
FIG. 8 is an enlarged view of portion I of FIG. 7.

Referring to FIGS. 7 and 8, FIG. 7 shows the fitting relationship between the eccentric wheel, the wedge-shaped block and the axis central hole, the shaft shoulder; and FIG. 8 is an enlarged view of portion I of FIG. 7.

In the wedging state, there is a line contact indicated by the contact line A' between the inner side surface of the wedge-shaped block 6 and the shaft shoulder 22; and there is a line contact indicated by the contact line B' between the outer side surface of the wedge-shaped block 6 and the axis central hole 32; and there are clearance contacts at the other portions. There is a line contact indicated by the contact line A between the inner side surface of the eccentric wheel 4 and the shaft shoulder 22; and there is a line contact indicated by the contact line B between the outer side surface of the eccentric wheel 4 and the axis central hole 32. As shown in figures, the axis of the inner ring gear is indicated as O, i.e., the axis of the shaft shoulder 22; and the axis of the outer ring gear 31 is indicated as O', i.e., the axis of the axis central hole 32. The contact lines A, B between the eccentric wheel 4 and the axis central hole 32, the shaft shoulder 22 and the contact lines A', B' between the wedge-shaped block 6 and the axis central hole 32, the shaft shoulder 22 are respectively located at opposite sides of the straight line formed by the eccentric distance OO'. Such design may ensure the force balance in the whole mechanism. In the embodiment, the inner side surface of the section of the eccentric wheel 4 abutting against the shaft shoulder 22 is a convex arc surface 42, which may ensure the line contact between the eccentric wheel 4 and the shaft shoulder 22. Similarly, the inner side surface of the section of the wedge-shaped block 6 abutting against the shaft shoulder 22 is a convex arc surface 63.

Further, the contact lines A, B between the eccentric wheel 4 and the axis central hole 32, the shaft shoulder 22 and the axis O of the shaft shoulder 22 are approximately in the same plane; and the contact lines A', B' between the wedge-shaped block 6 and the axis central hole 32, the shaft shoulder 22 and the axis O of the shaft shoulder 22 are also approximately in the same plane. Thus, the clearance eliminating component in the wedging state has a self-locking performance.

It should be understood that, when the load applied on the seat back and the inner toothed plate is further increased, the axis central hole of the outer toothed plate, the shaft shoulder of the inner toothed plate and the eccentric wheel may be partially brought into a plastic deformation. Thus, the force acting on the eccentric wheel may be distributed on the whole contour of the eccentric wheel, especially the positive eccentric region, so as to improve the force state of parts and increase the compression resistant ability of the eccentric wheel, which significantly increases the overall strength of the adjusting mechanism. The engagement eccentric distance direction between the inner ring gear 21 and the outer ring gear 31 corresponds to the portion of the eccentric wheel having a maximum structural strength, i.e. the portion of the eccentric wheel 4 having a largest radial dimension. Preferably, the large end surface 61 of the wedge-shaped block 6 and the inner wall 49 of the recess 41 of the eccentric wheel 4 facing the large end surface 61 deviate from the engagement eccentric distance direction, which may enhance the strength of the eccentric wheel 4 and increase the overall strength of the adjusting mechanism.

When the recliner is in a non-adjusting state, the above-mentioned components are in the wedging state shown in FIG. 7. At this moment, two side contours of the recess 41 of the eccentric wheel 4 are inside the contours of the wedge-shaped block 6 in the radial direction. When a larger load is applied, the self-locking state will be changed due to the elastic deformation of the components which are in contact with each other. Under the combination action of the shaft shoulder 22 of the inner toothed plate 2 and the axis central hole 32 of the outer toothed plate 3, the wedge-shaped block 6 will overcome the action of the wedging torsion spring 7 to rotate in the circumferential direction. When the wedge-shaped block 6 is rotated to the state in which the two side contours of the wedge-shaped block 6 are inside the two side contours of the eccentric wheel 4, the outer side contour 46 of the recess 41 of the eccentric wheel 4 contacts with the axis central hole 32 of the outer toothed plate 3, and the inner side contour 45 of the recess 41 of the eccentric wheel 4 contacts with the shaft shoulder 22 of the inner toothed plate 2. At this moment, the wedge-shaped block 6 does not rotate any more, and prevents the eccentric distance from being further decreased together with the eccentric wheel 4, so as to ensure the efficient engagement between the inner ring gear 21 and the outer ring gear 31, thereby increasing the strength of the whole adjusting mechanism.

A rotation shaft 52 of the drive component 5 sequentially passes through an inner hole of the wedging torsion spring 7, an inner hole 85 of the locking sheet 8, a center hole 23 of the inner toothed plate 2 and the jacket 1, and an elastic retainer ring is fitted in a groove 53 of the protruding end of the rotation shaft 52. The other shaft end of the drive component 5 passes through a center hole 101 of a sealing cover 10, and an elastic retainer ring is fitted in a groove 54 of the shaft end. In this way, the components of the seat recliner according to the present invention may be positioned axially. The drive component 5 is provided with a first drive arm 51' and a second drive arm 51 which are extending from the drive component 5 axially. The eccentric wheel 4 is provided with a first receiving region 47 and a second receiving region 47'. The upper portion of the second receiving region 47' and the small end portion of the wedge-shaped block 6 overlap with each other in the circumferential direction, as shown in FIG. 6. The second drive arm 51 passes through an arc hole 86' of the locking sheet 8 and is received in the first receiving region 47 of the eccentric wheel 4, abutting against the top side wall 48 of the first receiving region 47; and the first drive arm 51' passes through an arc hole 86' of the locking sheet 8 and is received in the second receiving region 47' below the small end portion of the wedge-shaped block 6, abutting against the small end surface 64 of the wedge-shaped block 6.

When adjusting the angle of the seat back, according to the requirement, an operator rotates the drive component 5 in the clockwise direction or in the counterclockwise direction. When the drive component 5 is rotated in the clockwise direction, the second drive arm 51 of the drive component 5 pushes the eccentric wheel 4 to rotate in the clockwise direction, so that the eccentric wheel 4 may overcome the elastic force of the wedging torsion spring 7 and is released from the wedging action, and thus the gear transmission mechanism is driven to rotate the outer toothed plate 3 in clockwise direction relative to the inner toothed plate 2, so as to adjust the angle of the seat back. When the drive component 5 is rotated in the counterclockwise direction, the first drive arm 51' of the drive component 5 pushes the small end surface 64 of the wedge-shaped block 6 in the second receiving region 47', so that the wedge-shaped block 6 may overcome the elastic force of the wedging torsion spring 7 and is released from the wedging action, and when the first drive arm 51' abuts against the top side wall 48' of the second receiving region 47', the gear transmission mechanism is driven to rotate the outer toothed plate 3 in counterclockwise direction relative to the inner toothed plate 2.

The sealing cover 10 has elasticity. When being assembled, the sealing cover 10 is elastically deformed and closely abuts against the drive component 5 to seal and protect the adjusting mechanism.

Figure 10:
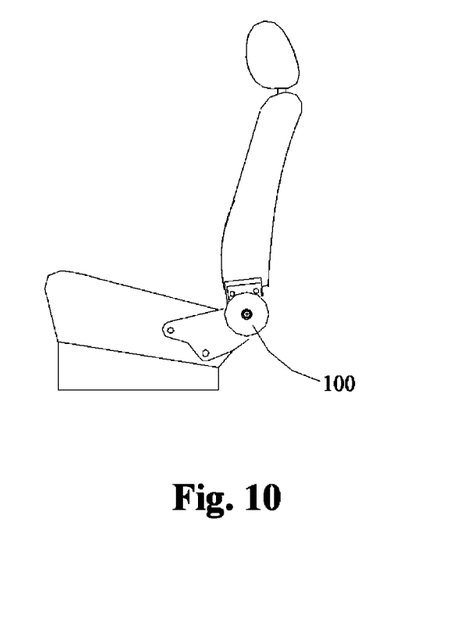
FIG. 10 is a view showing an appearance of the seat according to the present invention.

Please refer to FIG. 10, which is a view showing an appearance of the seat according to the present invention. The seat includes a seat cushion and a seat back which are hinged together, and a seat recliner 100 provided between the seat cushion and the seat back. The seat recliner 100 adopts the above-mentioned recliner. The basic structures of the seat cushion and the seat back as well as the connection relationship therebetween are completely same as that in the prior art, and thus will be not described repeatedly.

In sum, the seat recliner according to the present invention may achieve a stepless adjustment. There is a lesser clearance for the seat back of the seat. Besides, the recliner has a good lock performance. The present invention may be adjusted manually or electrically.

Figure 9:
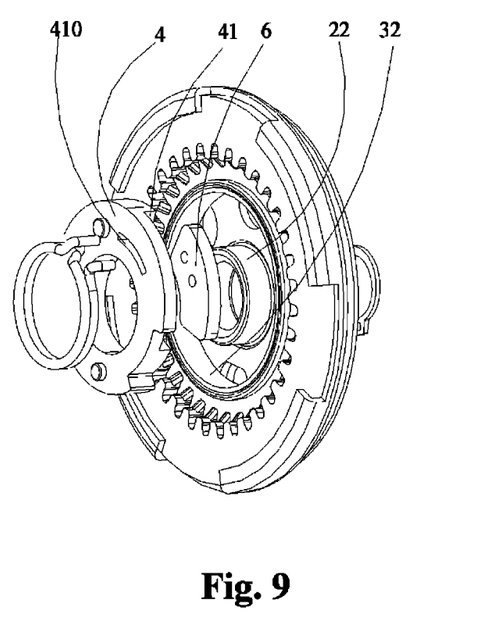
FIG. 9 is an exploded view of the assembling relationship that the wedging torsion spring and the wedge-shaped block are respectively disposed two sides of the eccentric wheel in the embodiment.

The preferred embodiments of the present invention have been described above. It should be noted that, many improvements and modifications may be made by the ordinary skilled in the art without departing from the principle of the present invention. For example, as shown in FIG. 9, the wedging torsion spring and the wedge-shaped block may be provided at opposite sides of the eccentric wheel, respectively. An arc groove 410 is provided at the bottom wall of the recess of the eccentric wheel, through which the supporting legs of the elastic member may be pass, so as to install the wedge-shaped block in the space enclosed by the recess 41 of the eccentric wheel, the shaft shoulder 22 of the inner toothed plate 2, the surface of the inner toothed plate 2 on which the shaft shoulder 22 lies, and the axis central hole 32 of the outer toothed plate 3. These improvements and modifications should be deemed to fall into the protection scope of the present invention.

What is claimed is:

1. A seat recliner, comprising:
   an inner toothed plate having an inner ring gear and fixedly connected with a seat back, a shaft shoulder being provided at a center of the inner toothed plate;
   an outer toothed plate having an outer ring gear and fixedly connected with a seat cushion, an axis central hole being provided at a center of the outer toothed plate; the outer ring gear being engaged with the inner ring gear, wherein the shaft shoulder is eccentrically disposed relative to the axis central hole to form a radially eccentric region between the shaft shoulder and the axis central hole;
   an eccentric wheel provided in the radially eccentric region, and wherein the eccentric wheel, the inner toothed plate and the outer toothed plate forms a planetary gear transmission mechanism with small tooth number difference;
   a wedge-shaped block provided in the radially eccentric region;
   wherein the eccentric wheel and the wedge-shaped block are configured to eliminate a clearance between the eccentric wheel and the axis central hole of the outer toothed plate as well as a clearance between engaged teeth under a circumferential force exerted by an elastic member; and
   a drive component driving the eccentric wheel or the wedge-shaped block so as to rotate the inner toothed plate by an angle relative to the outer toothed plate; wherein
   the eccentric wheel is of integral eccentric annular shape and fully occupies a first eccentric region between the shaft shoulder of the inner toothed plate and the axis central hole of the outer toothed plate, wherein the first eccentric region is in a direction along which a radial space size becomes largest in the radially eccentric region;

the wedge-shaped block is disposed in a recess of the eccentric wheel, wherein the wedge-shaped block includes an inner side surface and an outer side surface, wherein the inner side surface contacts the shaft shoulder in a wedging state and the outer side surface contacts the axis central hole in the wedging state.

2. The seat recliner according to claim 1, wherein the recess for receiving the wedge-shaped block is provided at a position on the eccentric wheel deviating from the first eccentric direction, and the wedge-shaped block is rotatable in the recess circumferentially.

3. The seat recliner according to claim 2, wherein the elastic member is a wedging torsion spring and has two axial supporting legs which are disposed in the same direction, one axial supporting leg is insertedly installed in the wedge-shaped block, and the other axial supporting leg abuts against a side wall of the recess close to the first eccentric direction.

4. The seat recliner according to claim 3, wherein the wedging torsion spring and the wedge-shaped block are respectively provided at opposite sides of the eccentric wheel; an arc groove is provided in a bottom wall of the recess of the eccentric wheel, and the two axial supporting legs of the wedging torsion spring extend through the arc groove and then fit with the wedge-shaped block and the eccentric wheel, respectively.

5. The seat recliner according to claim 4, wherein a thickness of the wedge-shaped block matches with a depth of the recess of the eccentric wheel.

6. The seat recliner according to claim 3, wherein a depression is provided on the side wall of the recess abutting against the axial supporting leg of the wedging torsion spring, and the depression has a cross section of a semicircle shape or a rectangular shape.

7. The seat recliner according to claim 6, wherein the wedging torsion spring and the wedge-shaped block are respectively provided at opposite sides of the eccentric wheel; an arc groove is provided in a bottom wall of the recess of the eccentric wheel, and the two axial supporting legs of the wedging torsion spring extend through the arc groove and then fit with the wedge-shaped block and the eccentric wheel, respectively.

8. The seat recliner according to claim 7, wherein a thickness of the wedge-shaped block matches with a depth of the recess of the eccentric wheel.

9. A seat comprising a seat cushion and a seat back which are hinged together, and a seat recliner provided between the seat cushion and the seat back, wherein the seat recliner adopts the recliner according to claim 1.

10. The seat according to claim 9, wherein the recess for receiving the wedge-shaped block is provided at a position on the eccentric wheel deviating from the first eccentric direction, and the wedge-shaped block is rotatable in the recess circumferentially.

11. The seat according to claim 10, wherein the elastic member is a wedging torsion spring and has two axial supporting legs which are disposed in the same direction, one axial supporting leg is insertedly installed in the wedge-shaped block, and the other axial supporting leg abuts against a side wall of the recess close to the first eccentric direction.

12. The seat according to claim 11, wherein a depression is provided on the side wall of the recess abutting against the axial supporting leg of the wedging torsion spring, and the depression has a cross section of a semicircle shape or a rectangular shape.

13. The seat according to claim 12, wherein the wedging torsion spring and the wedge-shaped block are respectively provided at opposite sides of the eccentric wheel; an arc groove is provided in a bottom wall of the recess of the eccentric wheel, and the two axial supporting legs of the wedging torsion spring extend through the arc groove and then fit with the wedge-shaped block and the eccentric wheel, respectively.

14. The seat according to claim 13, wherein a thickness of the wedge-shaped block matches with a depth of the recess of the eccentric wheel.

15. The seat according to claim 11, wherein the wedging torsion spring and the wedge-shaped block are respectively provided at opposite sides of the eccentric wheel; an arc groove is provided in a bottom wall of the recess of the eccentric wheel, and the two axial supporting legs of the wedging torsion spring extend through the arc groove and then fit with the wedge-shaped block and the eccentric wheel, respectively.

16. The seat according to claim 15, wherein a thickness of the wedge-shaped block matches with a depth of the recess of the eccentric wheel.

* * * * *